United States Patent [19]

Schlesinger et al.

[11] 4,331,936
[45] May 25, 1982

[54] FREE ELECTRON LASER EMPLOYING AN EXPANDED HOLLOW INTENSE ELECTRON BEAM AND PERIODIC RADIAL MAGNETIC FIELD

[75] Inventors: S. Perry Schlesinger; Thomas C. Marshall; David B. McDermott, all of New York, N.Y.; Victor L. Granatstein, Silver Spring, Md.; Robert K. Parker, Alexandria, Va.; Phillip A. Sprangle, Silver Spring, Md.; Philip C. Efthimion, Princeton Junction, N.J.

[73] Assignee: The United States of America as represented by the Secretary of the Air Force, Washington, D.C.

[21] Appl. No.: 92,801

[22] Filed: Nov. 9, 1979

[51] Int. Cl.³ ................................................ H01S 3/09
[52] U.S. Cl. ........................................ 372/2; 372/37; 372/20; 372/26
[58] Field of Search ................... 331/94.5 P, 94.5 PE, 331/94.5 C, 94.5 D

[56] References Cited

U.S. PATENT DOCUMENTS 3,789,257  1/1974  Friedman et al. ..................... 315/3
3,958,189  5/1976  Sprangle et al. ............. 331/94.5 PE

OTHER PUBLICATIONS

"High-Power Free-Electron Laser Based on Stimulated Raman Backscattering", by McDermott et al., *Phys. Rev. Lett.*, vol. 41, No. 20, (Nov. 13, 1978).
"Strong Submillimeter Radiation From Intense Relativistic Electron Beams", by Granatstein et al., *IEEE Transt. on Microwave Theory and Techniques*, vol. MTT-22, No. 12, Dec. 74.
"Multiple Gas E-Beam Pumped Lasers", by Dreyfus, *IBM Tech. Dis. Bull.*, vol. 22, No. 9, (Feb. 78).
"Shock-Wave Introduction of Gas Into Relativistic E-Beam Pumped Lasers and Drift Tubes", *App. Phys. Lett.*, vol. 29, No. 6, pp. 348-350, (Sep. 15, 1976).

*Primary Examiner*—William L. Sikes
*Assistant Examiner*—Leon Scott, Jr.
*Attorney, Agent, or Firm*—Donald J. Singer; Willard R. Matthews, Jr.

[57] ABSTRACT

The generation of very high power pulses of coherent electromagnetic radiation that are continuously tunable in frequency is accomplished by means of a free electron laser in which a hollow relativistic electron beam is projected along the longitudinal axis of an evacuated drift tube. A first magnetic field expands the electron beam into an annular peripheral interaction region of the drift tube where the beam interacts with a second periodic radial magnetic field. Frequency is varied by changing the electron velocity of the electron beam or by changing the periodicity of the radial magnetic field. The device can be made to operate as an oscillator by the inclusion of resonant cavity defining mirrors within the interaction region, or as an amplifier by injecting a coherent radiation signal into the interaction region. Both oscillator and amplifier functions can be incorporated into a single device. Linewidth is narrowed by utilizing a Smith-Fox interferometer to couple the generated coherent radiation into an output light pipe.

9 Claims, 6 Drawing Figures 4,331,936

FREE ELECTRON LASER EMPLOYING AN EXPANDED HOLLOW INTENSE ELECTRON BEAM AND PERIODIC RADIAL MAGNETIC FIELD

STATEMENT OF GOVERNMENT INTEREST

The invention described herein may be manufactured and used by or for the Government for governmental purposes without the payment of any royalty thereon.

BACKGROUND OF THE INVENTION

This invention relates to high power coherent radiation sources and in particular to a continuously tunable free electron laser capable of generating high power pulses in the millimeter through submillimeter range.

State-of-the-art coherent radiation sources in the frequency range of interest (infrared, optical to ultraviolet) are typically molecular lasers which operate at fixed frequencies and are not widely tunable. Tunable dye lasers do exist, but these are limited in power since the dye will decompose by heating when the power becomes too large.

A recent development in high power coherent radiation sources is the free electron laser. A description of such a device is given in the periodical article *First Operation of a Free Electron Laser,* by D. A. G. Deacon et al., Physical Review Letter, April 1977, Volume 38, No. 16 PP892–894. The free electron laser of Deacon et al. is similar to the present invention in that it is widely tunable and does not contain a lasing medium which can be thermally damaged. However, it is driven by a low current electron beam from a linear accelerator and so is limited in peak power. The low current also limits the gain and efficiency of the device.

An improved apparatus and technique for providing tunable high power millimeter and submillimeter radiation utilizing free electron laser principles is disclosed by U.S. Pat. application Ser. No. 3,958,189 entitled *Simulated Coherent Cyclotron Scattering, Millimeter, and Submillimeter Wave Generator* issued to Phillip A. Sprangle et al. May 18, 1976. This device combines an optical cavity, an electromagnetic pump wave and an intense relativistic electron beam accelerator to achieve a tunable source of coherent radiation. However, because of the very powerful electromagnetic pump required by this device it is expensive and difficult to realize.

It is apparent from the foregoing review of the state-of-the-art that there currently exists the need for a coherent radiation source that is continuously and easily tunable, not limited in power, that has improved gain and efficiency and that can be easily and economically realized.

The present invention is directed toward satisfying that need.

SUMMARY OF THE INVENTION

The invention comprises an intensive relativistic electron beam generator injecting a hollow beam along the longitudinal axis of an evacuated drift tube. The electron beam is expanded into an annular peripheral interaction region within the drift tube by a magnetic field. A periodic radial magnetic field in the interaction region is provided by an undulator and the interaction of the beam with the periodic magnetic field generates coherent radiation that is deflection coupled to an output light pipe. Oscillator operation is realized by the inclusion of resonant cavity defining mirrors placed within the interaction region. Alternatively an input coherent signal can be amplified by injecting it into the interaction region. Both oscillator and amplifier modes of operation can be achieved in a single device. Tuning is accomplished by varying either the relativistic beam velocity or by varying the periodicity of the undulator. Interferometer means can be used to couple radiation into the output light pipe for improved linewidth.

It is a principal object of the invention to provide a new and improved source of high power coherent radiation.

It is another object of the invention to provide an improved high power free electron laser.

It is another object of the invention to provide a high power free electron laser that is easily and continuously tunable.

It is another object of the invention to provide a high power free electron laser oscillator.

It is another object of the invention to provide a high power free electron laser amplifier.

It is another object of the invention to provide a high power free electron laser device having both oscillator and amplifier modes of operation.

It is another object of the invention to provide a high power free electron laser device having an improved linewidth output.

It is another object of the invention to provide a high power free electron laser device having improved gain and efficiency.

These together with other objects features and advantages of the invention will become more readily apparent from the following detailed description when taken in conjunction with the illustrative embodiments of the accompanying drawings wherein like elements are given like reference numerals throughout.

DETAILED DESCRIPTION OF THE PREFERRED EMBODIMENTS

The invention comprehends apparatus and techniques adapted to generate very high power pulses of coherent electromagnetic radiation (potentially $>10^9$ watts) that are easily and continuously tunable in frequency. Center frequency of operation ranges from millimeter waves through submillimeter, infrared, optical to the ultraviolet.

Figure 1:
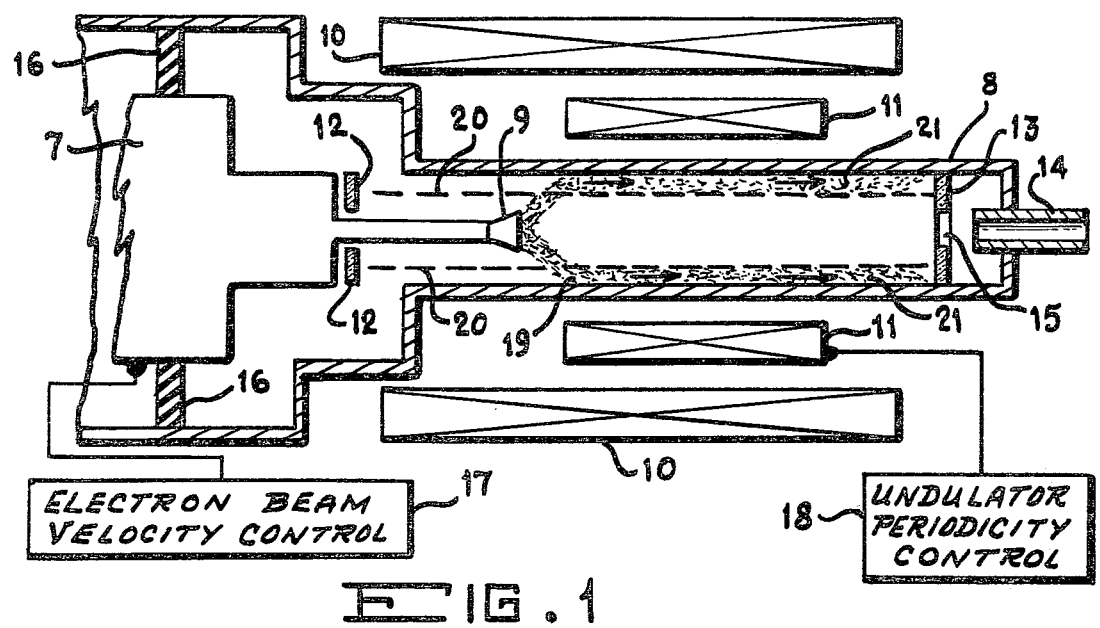
FIG. 1 is a sectional view of the oscillator embodiment of the invention.
Figure 2:
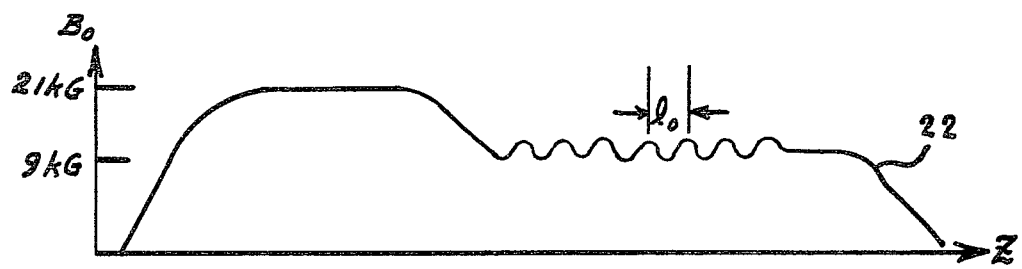
FIG. 2 is a curve showing the magnetic field profile along the structure of the embodiment of FIG. 1.

One presently preferred embodiment of the invention that accomplishes this is illustrated by FIG. 1. It comprises intense relativistic electron beam generator 7 having a cathode 9 which generates and projects hollow intense cold relativistic electron beam 19 into drift tube 8 along the tube's longitudinal axis. Drift tube 8 is of electrically conductive material at a high positive potential voltage and is insulated from cathode 9 (negative potential voltage) and the beam generator 7 by insulation means 16. Drift tube 8 is evacuated by a conventional vacuum system (not shown). Electron beam generator 7 can be any conventional or prior known voltage source capable of providing voltage to a field emission cathode so as to produce a cold intense relativistic electron beam in drift tube 8 in a manner well known in the art. Such sources are generally well known and could be, for example, similar to those referred to in the article *Strong Submillimeter Radiation From Intense Relativistic Electron Beams* IEEE Transactions in Microwave Theory and Techniques, Vol MTT-22 No. 12 Dec. 1974 Part 1, pp 1000–10005. A magnetic field producing means shown schematically as solenoid 10 provides a magnetic field that is contoured to effect expansion of beam 19 into an annular peripheral interaction region 21 of drift tube 8. An undulator 11 introduces a periodic radial magnetic field into interaction region 21. The resultant magnetic field is illustrated by the profile curve 22 of FIG. 2. Undulator 11 can be constructed of insulated aluminum rings through which current flows in opposite directions or it can be any other conventional means for generating the desired magnetic field configuration. The periodicity of undulator 11 is controlled by undulator periodicity control 18 and can be accomplished by electronically switching aluminum rings or by any other suitable state-of-the-art means. The electron velocity of electron beam 19 is controlled by electron beam velocity control 17 by controlling the capacitance of the beam generator 7 or by other conventional means.

An oscillator mode of operation is realized by means of ring shaped mirrors 12, 13 which establish a resonant cavity within drift tube 8 wherebetween rays 20 are reflected. Coherent radiation generated by interaction of the beam 19 with the undulator field is diffraction coupled through aperture 15 in mirror 13 to output light pipe 14.

Figure 3:
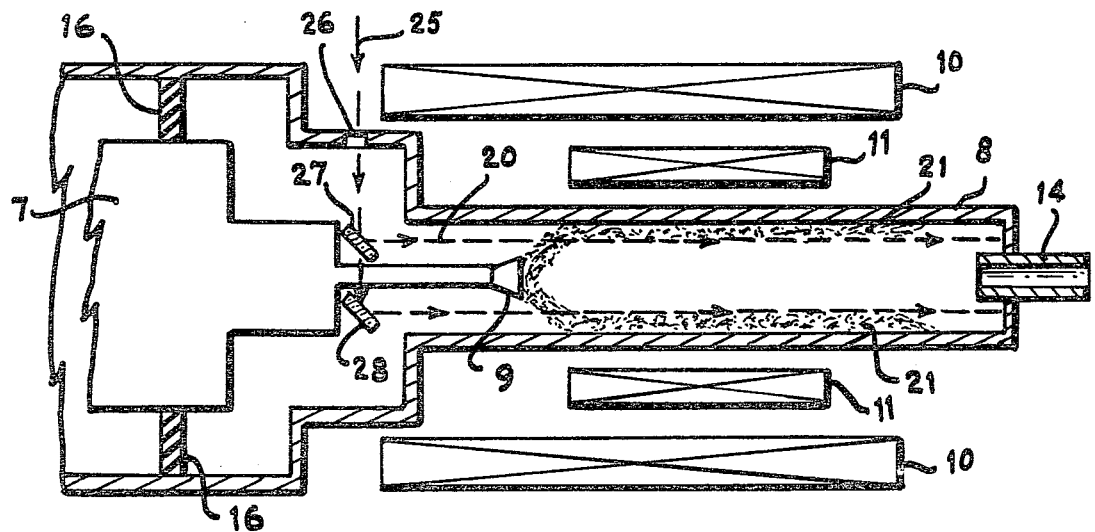
FIG. 3 is a sectional view of the amplifier embodiment of the invention.

Referring now to FIG. 3 there is illustrated thereby an embodiment of the invention that provides amplification of a coherent input signal 25. The coherent input signal 25 in this embodiment is projected through a vacuum window 25 onto mirrors 27, 28 whereby it is directed into the interaction region 21 where it is amplified prior to being deflection coupled out of output light pipe 14.

Figure 4:
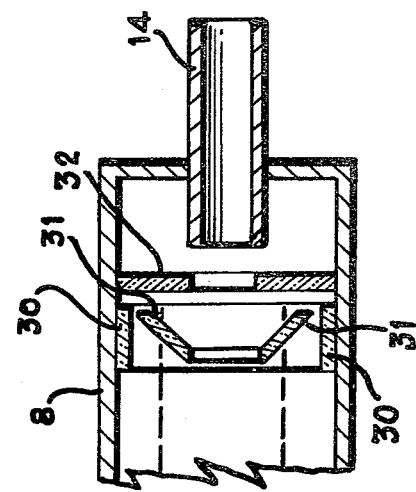
FIG. 4 is a detail illustrating the Smith-Fox interferometer output coupling feature of the invention.

FIG. 4 illustrates the improved linewidth feature of the invention. This comprehends coupling the coherent radiation out of the device by means of the mirror combination of cylindrical mirror 30, truncated conical partial mirror 31, and ring shaped mirror 32. This arrangement comprises a so-called Smith Fox interferometer and its principles of operation are described in detail in the publication of P. W. Smith entitled *Stabilized Single Frequency Output From A Long Laser Cavity*, Journal of Quantum Electronics, November 1965, Vol QE-1, No. 8, pp 344–348.

Figure 5:
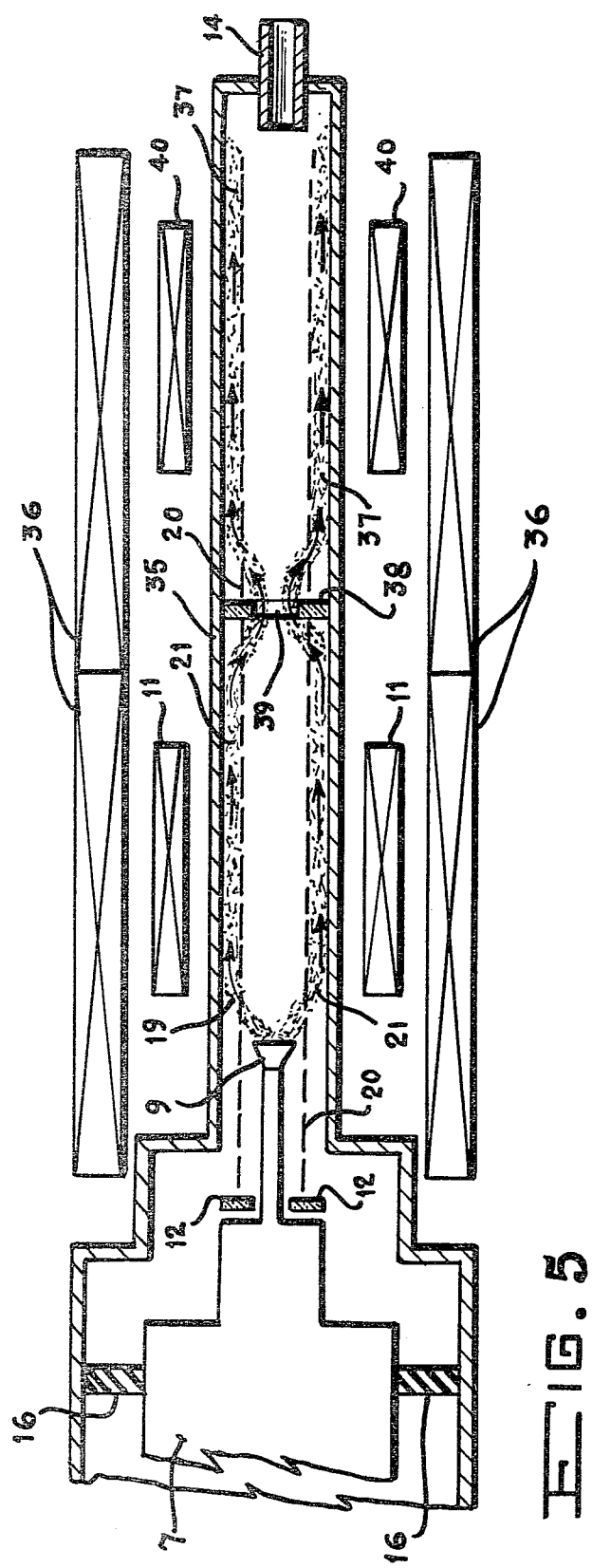
FIG. 5 is a sectional view of the combined oscillator-amplifier embodiment of the invention.

The combined oscillator-amplifier embodiment of the invention is illustrated by FIG. 5. This embodiment includes elongated drift tube 35, elongated magnetic field producing means 36, a second undulator 40 and partial mirror 38. Magnetic field producing means 36 is adapted to configure a magnetic field that expands the electron beam 19 into first interaction region 21, contracts the beam to pass through the aperture 39 of partial mirror 38 and then expands it into a second interaction region 37. Mirror 12 and partial mirror 38 establish a resonant cavity that includes interaction region 21 and effects oscillator operation in that portion of the drift tube. The coherent radiation signal generated therein passes through partial mirror 38 in the manner of a conventional laser output and is amplified in the second interaction region 37.

Referring again to FIG. 1 the invention operates as follows: Intense relativistic beam generator 7 injects a low impedance (1 ohm–1000 ohms) electron beam 19 into evacuated drift tube 8 guided by the lines of magnetic field provided by solenoid 10. The magnetic field lines at first diverge and then become parallel so that an expanded hollow electron beam is formed which is larger in diameter than the cathode 9. A quasi-optical cavity is formed by mirrors 12 and 13 such that rays 20 are reflected between the mirrors and through the expanded electron beam without being intercepted by the cathode. The expanded intense electron beam interacts with a periodic radial magnetic field provided by undulator solenoid 11. The interaction is a parametric process and allows for amplification of waves at a wavelength $\lambda_s \approx l_o/2\gamma_z^2$, where $l_o$ is the period of the undulator solenoid field and $\gamma_z$ is a relativistic factor corresponding to the axial electron velocity $V_z$ (viz, $\gamma_z = (1 = V_z^2/C^2)^{-\frac{1}{2}}$ where C is the speed of light). The electron beam is collected on the walls of the drift tube and radiation at $\lambda_s$ is diffraction coupled into output light pipe 14 through a hole 15 in the center of mirror 13. Frequency is varied by changing the accelerator voltage or the undulator period.

The publication by D. B. McDermott et al., entitled *A High Power Free Electron Laser*, Physical Review Letter 41, Nov. 13, 1978, p. 1368 provides theoretical details as well as test results and evaluation of the invention and is incorporated herein by reference.

The invention has several significant advantages over currently available high power coherent radiation sources. Compared to the device of Deacon et al. which combined an optical cavity (mirrors), undulator solenoid, and a low current electron beam from a linear accelerator, the present invention retains the optical cavity and undulator but replaces the linear accelerator with an intense relativistic electron beam accelerator. Because of the much larger electron current, the single pass gain and the efficiency of the laser process are much larger than in the device of Deacon et al. The laser process with an intense electron beam can also be made especially strong by involving the participation of plasma oscillations on the electron beam. The device then becomes a parametric amplifier with the undulator field acting as the pump and the plasma oscillations acting as the idler.

Compared to the invention of Sprangle et al. (U.S. Pat. No. 3,958,189) which combined an optical cavity, an electromagnetic pump wave and an intense relativistic electron beam accelerator, the present invention retains the optical cavity and the intense beam accelerator, but replaces the electromagnetic pump wave with the undulator solenoid. The undulator solenoid is much easier and less expensive to realize than a source for the very powerful electromagnetic pump wave required in the invention of Sprangle. Also the period and amplitude of the magnetic field undulator may be varied along the device axis in such a way as to enhance efficiency. Such a variation is not readily realizable with an electromagnetic pump wave.

Figure 6:
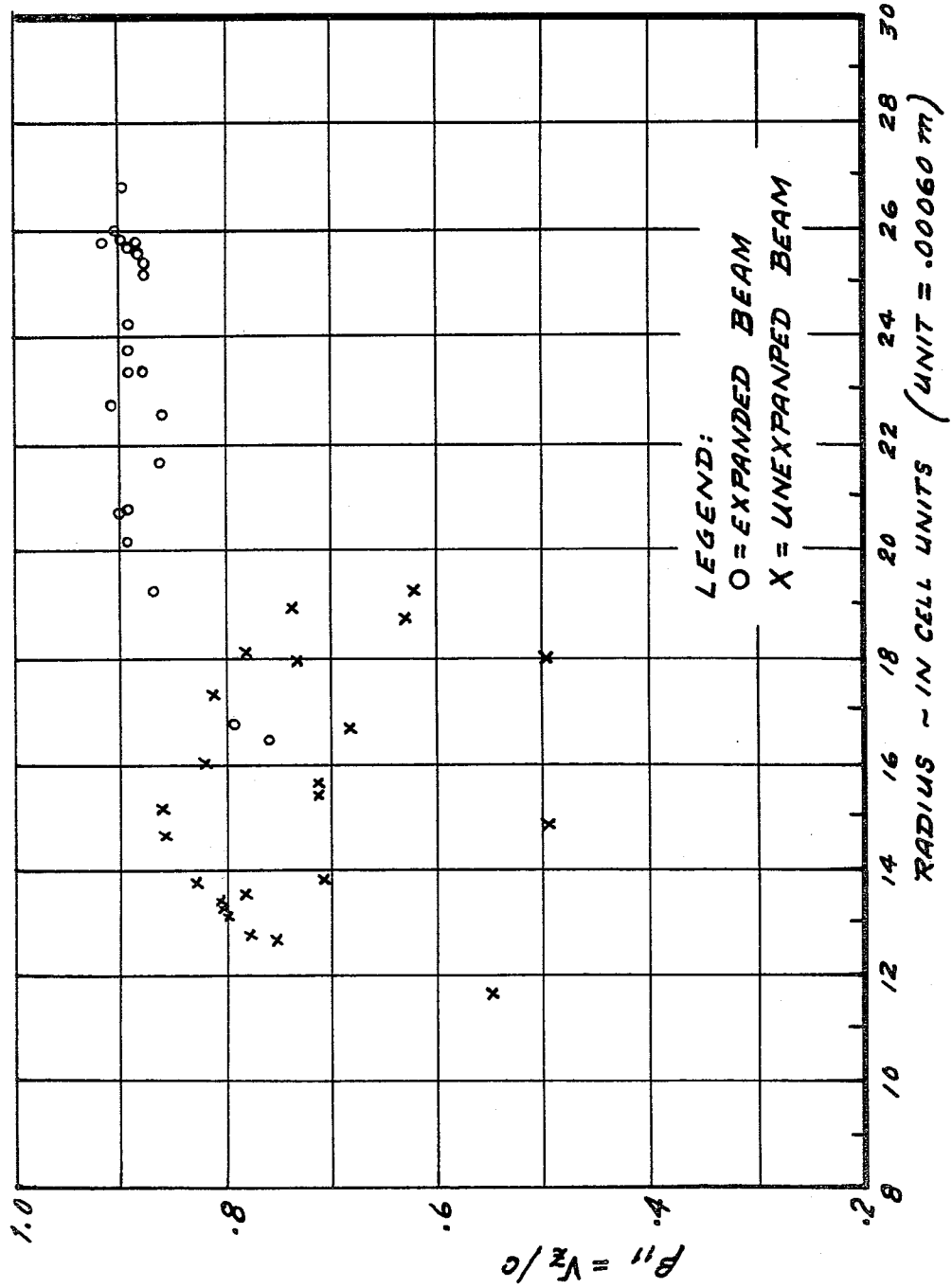
FIG. 6 is a graph of z-velocity profile for expanded and unexpanded beams from a foilless diode.

Further the present invention comprehends a means for taking the intense electron beam away from the cathode in such a way that the cathode does not interfere in the beam optical cavity interaction. This is not trivial since stable control of an intense relativistic electron beam is problematical. The means employed consists of generating a beam with annular cross-section and expanding the radius of the annulus to be much larger than the cathode by means of shaping the guiding magnetic field. This beam expansion has been found to greatly reduce the spread in electron velocity as may be seen in FIG. 6 which plots the results of a computer study of expanded and unexpanded beams. A decreased electron velocity spread enhances laser gain and efficiency. Expanding the beam also increases the strength of undulator field seen by the electrons, it allows the beam to carry a larger current, and it decreases the space-charge potential drop across the beam; all these effects are beneficial to laser action.

While the invention has been described in presently preferred embodiment it is understood that the words which have been used are words of description rather than words of limitation and that changes within the purview of the appended claims may be made without departing from the scope and spirit of the invention in its broader aspects.

What is claimed is:

1. A source of high power coherent radiation comprising
   an evacuated drift tube having an output for coherent radiation,
   means for generating an intense relativistic electron beam projecting a cylindrical beam of relativistic electrons along the longitudinal axis of said drift tube,
   a first means for producing a magnetic field positioned to effect expansion of said cylindrical beam into an annular peripheral interaction region of said drift tube, and
   a second means for producing a magnetic field adapted to provide a periodic radial magnetic field in said interaction region, said periodic radial magnetic field interacting with the expanded cylindrical beam of relativistic electrons to effect the generation of coherent radiation.

2. A source of high power coherent radiation as defined in claim 1 including means for varying the frequency of the coherent radiation resulting from the interaction of the expanded cylindrical beam of relativistic electrons and said periodic radial magnetic field.

3. A source of high power coherent radiation as defined in claim 2 wherein the means for varying the frequency of coherent radiation comprises means for varying the axial electron velocity of said beam.

4. A source of high power coherent radiation as defined in claim 2 wherein said means for varying the frequency of coherent radiation comprises means for varying the periodicity of said periodic radial magnetic field.

5. A source of high power coherent radiation as defined in claim 2 including mirror means defining a resonant cavity within said drift tube, said interaction region being within said resonant cavity.

6. A source of high power coherent radiation as defined in claim 2 including an input for injecting a coherent modulation signal into said interaction region.

7. A source of high power coherent radiation as defined in claim 2 wherein said output for coherent radiation comprises a light pipe, radiation generated in said interaction region being diffraction coupled into said light pipe.

8. A source of high power coherent radiation as defined in claim 7 including interferometer means coupling coherent radiation generated in said interaction region into said light pipe.

9. A source of high power coherent radiation comprising
   an evacuated drift tube having an output for coherent radiation,
   means for generating an intense relativistic electron beam projecting a cylindrical beam of relativistic electrons along the longitudinal axis of said drift tube,
   a first means for producing a magnetic field positioned to effect expansion of said cylindrical beam into a first annular peripheral interaction region of said drift tube; contraction of said cylindrical beam at the end of said first interaction region; and, subsequent expansion of said cylindrical beam into a second annular peripheral interaction region of said drift tube,
   a second means for producing a magnetic field positioned to provide a periodic radial magnetic field in said first interaction regions,
   a third means for producing a magnetic field positioned to provide a periodic radial magnetic field in said second interaction region; and
   mirror means, said mirror means defining a resonant cavity within said drift tube, said first annular peripheral interaction region being within said resonant cavity.

* * * * *